(12) United States Patent
Kubo et al.

(10) Patent No.: US 7,812,493 B2
(45) Date of Patent: Oct. 12, 2010

(54) SPINDLE APPARATUS

(75) Inventors: Atsushi Kubo, Matsubara (JP); Hironori Kameno, Yamatokoriyama (JP); Takayuki Ishigami, Tokyo (JP)

(73) Assignee: Jtekt Corporation, Osaka-Shi (JP)

( * ) Notice: Subject to any disclaimer, the term of this patent is extended or adjusted under 35 U.S.C. 154(b) by 147 days.

(21) Appl. No.: 12/076,741

(22) Filed: Mar. 21, 2008

(65) Prior Publication Data
US 2008/0231129 A1 Sep. 25, 2008

(30) Foreign Application Priority Data
Mar. 23, 2007 (JP) ............................ 2007-075836

(51) Int. Cl.
*H02K 7/09* (2006.01)
*B23B 19/02* (2006.01)
*B23Q 11/00* (2006.01)

(52) U.S. Cl. ........................... 310/90.5; 310/51; 310/89

(58) Field of Classification Search ................... 310/51, 310/90.5, 89; 361/139, 143, 144
See application file for complete search history.

(56) References Cited

U.S. PATENT DOCUMENTS

| 4,180,946 | A | | 1/1980 | Heijkenskjold et al. | |
|---|---|---|---|---|---|
| 5,760,510 | A | * | 6/1998 | Nomura et al. | 310/90.5 |
| 6,806,606 | B2 | * | 10/2004 | Ohtachi et al. | 310/90.5 |
| 2008/0231129 | A1 | * | 9/2008 | Kubo et al. | 310/90.5 |

FOREIGN PATENT DOCUMENTS

| DE | 10 2005 001 494 A1 | 7/2006 |
|---|---|---|
| EP | 0 674 112 A1 | 9/1995 |
| JP | 11-099433 | 4/1999 |
| JP | 2000-141104 | 5/2000 |
| JP | 2000-167739 | 6/2000 |
| JP | 2001-041240 | 2/2001 |
| JP | 2002-039177 | 2/2002 |
| WO | WO 88/03458 | 5/1988 |

OTHER PUBLICATIONS

European Search Report dated Jul. 8, 2008 with an English language translation.

* cited by examiner

*Primary Examiner*—Quyen Leung
*Assistant Examiner*—David W. Scheuermann
(74) *Attorney, Agent, or Firm*—McGinn IP Law Group, PLLC

(57) ABSTRACT

In a spindle apparatus for a machine tool, a spindle is supported on a housing by support-purpose bearing devices, and is rotated by an electric motor, and a tool is attached to a tool attaching portion formed at a distal end of the spindle. A radial magnetic bearing for vibration suppressing purposes which includes a plurality of electromagnets is provided around the tool attaching portion of the spindle. A plurality of radial displacement sensors for detecting a displacement of the tool attaching portion in radial directions are provided around the tool attaching portion. There is provided an electromagnet control unit for controlling the electromagnets of the radial magnetic bearing on the basis of outputs of the radial displacement sensors so as to support the tool attaching portion in a predetermined position.

7 Claims, 3 Drawing Sheets

SPINDLE APPARATUS

BACKGROUND OF THE INVENTION

This invention relates to a spindle apparatus for a machine tool, and more particularly to a machine tool spindle apparatus including a spindle which is rotated with a tool attached to a distal end thereof.

In a machine tool spindle apparatus of the type described, when the product of the number of blades of a tool and a rotational frequency of a spindle or an integral multiple of this product is in agreement with a natural vibration of the spindle or in the vicinity of this natural vibration, resonance (chattering vibration) occurs, so that a machined surface is often rough.

In order to prevent the generation of such resonance, there has been proposed a method in which the machining is effected with a reduced number of revolutions of the spindle so that the product of the number of the blades of the tool and the rotational frequency of the spindle or an integral multiple of this product will not brought into agreement with the natural vibration of the spindle (see, for example, JP-A-2002-039177).

However, when the machining is carried out with the reduced number of revolutions of the spindle as described above, there is encountered a problem that the time required for the machining operation increases.

SUMMARY OF THE INVENTION

It is an object of this invention to solve the above problem, and more specifically to provide a spindle apparatus for a machine tool in which the generation of resonance of a spindle can be suppressed without decreasing the number of revolutions of the spindle.

According to the present invention, there is provided a spindle apparatus for a machine tool comprising:

a housing;

a spindle that is rotatably supported by the housing through a support-purpose bearing unit and is formed with a tool attaching portion at a distal end thereof;

a driver that rotates the spindle;

a tool attached to the tool attaching portion;

a radial magnetic bearing that includes a plurality of electromagnets disposed around the tool attaching portion for suppressing vibration of the spindle;

a plurality of radial displacement sensors provided around the tool attaching portion for detecting a displacement of the tool attaching portion in a radial direction; and an electromagnet controller that controls the electromagnets of the radial magnetic bearing on the basis of outputs of the radial displacement sensors so as to support the tool attaching portion in a predetermined position.

The tool attaching portion of the spindle is supported in the predetermined position by the vibration-suppressing radial magnetic bearing provided around the tool attaching portion, and therefore the generation of resonance of the spindle is suppressed even without decreasing the number of revolutions of the spindle.

For example, the radial magnetic bearing comprises one pair of electromagnets opposed to each other in one radial direction with the tool attaching portion interposed therebetween, and another pair of electromagnets opposed to each other in another radial direction perpendicular to the one radial direction. However, the radial magnetic bearing may comprise three electromagnets arranged at equal intervals (that is, spaced 120 degrees from one another) in a circumferential direction around the tool attaching portion.

With respect to the radial displacement sensors, for example, one pair are arranged in the one radial direction, while another pair are arranged in the other radial direction.

Preferably, the machine tool spindle apparatus of the invention further comprises a resonance frequency detector for detecting a resonance frequency of the tool attaching portion on the basis of the outputs of the radial displacement sensors, and a phase lead controller for effecting a phase lead control for the detected resonance frequency.

With this construction, the generation of resonance of the spindle can be more effectively suppressed.

The detection of the resonance frequency is effected, for example, by effecting the frequency analysis of the outputs of the displacement sensors by the use of FFT (fast Fourier transform).

The phase lead controller is, for example, a digital phase lead filter formed by software.

In the machine tool spindle apparatus of the present invention, the generation of resonance of the spindle can be suppressed without decreasing the number of revolutions of the spindle as described above.

DETAILED DESCRIPTION OF PREFERRED EMBODIMENTS

A preferred embodiment of the present invention will now be described with reference to the drawings.

Figure 1:
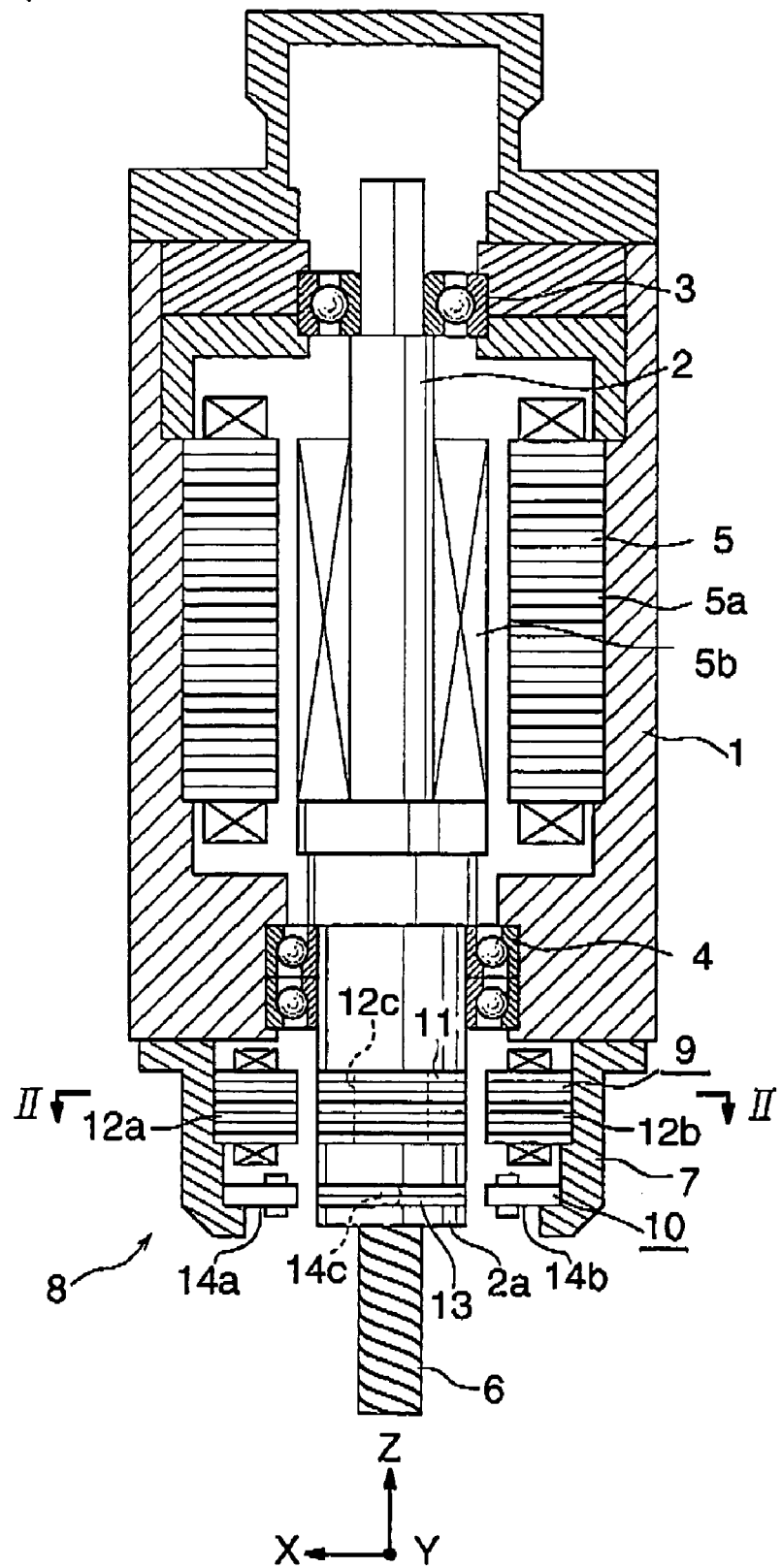
FIG. 1 is a longitudinal cross-sectional view showing one preferred embodiment of a machine tool spindle apparatus of the present invention.
Figure 2:
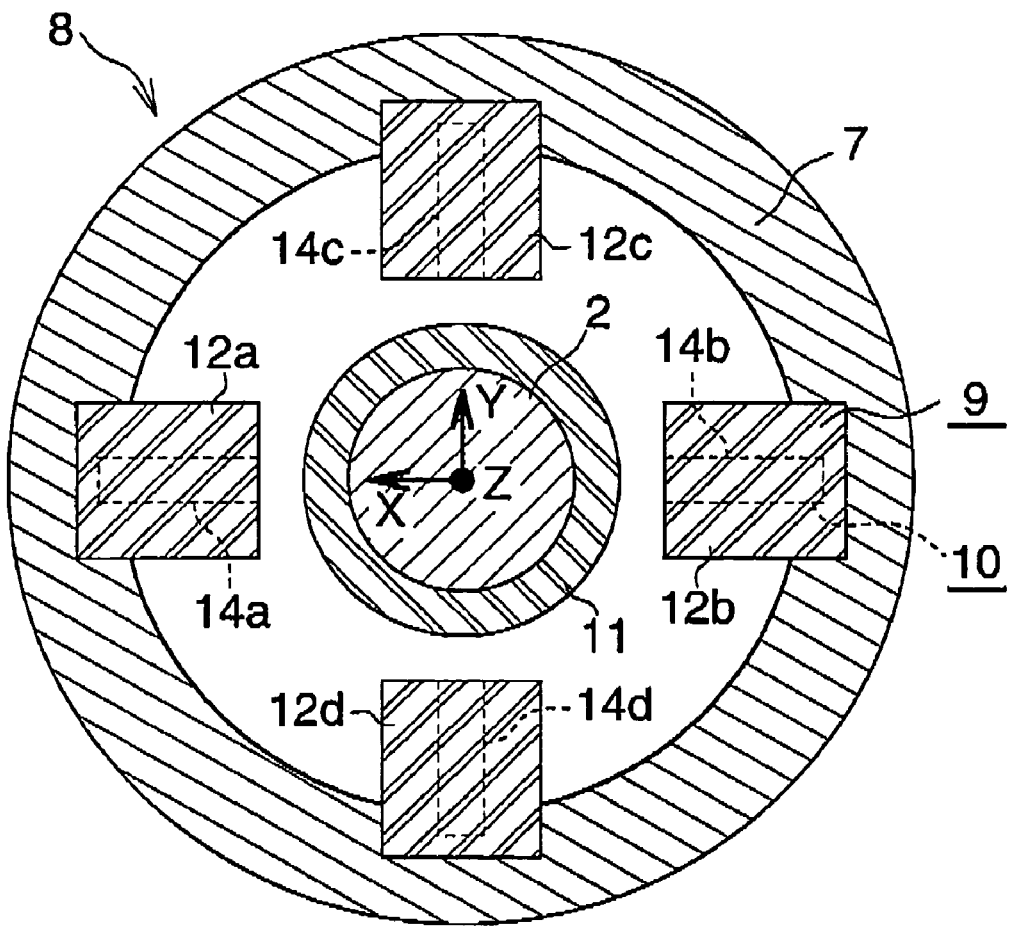
FIG. 2 is an enlarged transverse cross-sectional view taken along the line II-II of FIG. 1.
Figure 3:
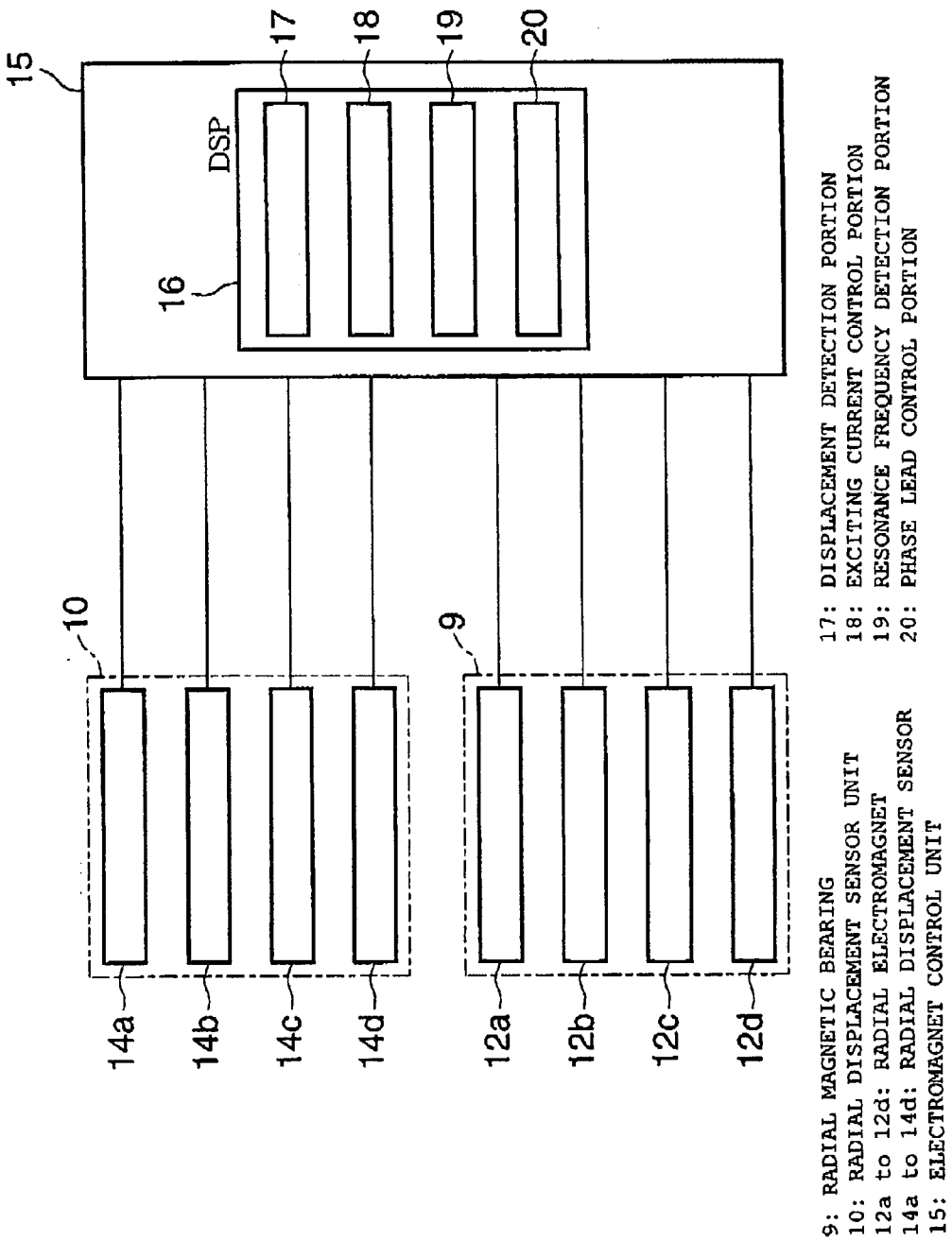
FIG. 3 is a block diagram showing one example of an electrical construction of a vibration suppressing device of the machine tool spindle apparatus.

FIG. 1 is a longitudinal cross-sectional view showing one example of a mechanical construction of a main portion of a spindle apparatus. FIG. 2 is an enlarged transverse cross-sectional view taken along the line II-II of FIG. 1, showing a vibration suppressing device of the spindle apparatus of FIG. 1 on an enlarged scale. FIG. 3 is a block diagram showing one example of an electrical construction of the vibration suppressing device.

The spindle apparatus is of the vertical type, in which a spindle 2 having a vertical axis is rotated within a vertical cylindrical housing 1. In the following description, a Z-axis direction means an axial direction (upward-downward direction) of the spindle 2, an X-axis direction and a Y-axis direction which are perpendicular to each other and are also perpendicular to the Z-axis direction mean two radial directions (horizontal direction), respectively.

Two portions of the spindle 2 which are disposed adjacent respectively to upper and lower ends thereof are rotatably supported on the housing 1 by respective bearing devices 3 and 4. The bearing devices 3 and 4 comprises rolling bearings. In this embodiment, the upper bearing device 3 comprises a deep groove ball bearing, and the lower bearing device 4 comprises a combination of two angular contact ball bearings. The two bearing devices 3 and 4 form a support-purpose bearing unit, and support the rotation of the spindle 2 in the axial direction and the radial direction.

An internal electric motor 5 forming a driver for driving or rotating the spindle 2 is provided between the upper and lower bearing devices 3 and 4. The motor 5 comprises a stator 5a mounted on the housing 1, and a rotor 5b mounted on the spindle 2.

That portion of the spindle 2 disposed downwardly of the lower bearing device 4 projects downwardly from the housing 1, and serves as a tool attaching portion 2a. A tool 6 is attached to this tool attaching portion 2a from the lower side. In the illustrated example, an end mill is attached to the tool attaching portion 2a. The tool 6 attached to the tool attaching portion 2a can be exchanged with other tools.

A vertical cylindrical support member 7 is fixed to a lower end face of the housing 1. The support member 7 is disposed coaxially with the spindle 2, and surrounds the tool attaching portion 2a. A programmable radial magnetic bearing 9 for vibration suppressing purposes and a radial displacement sensor unit 10 are mounted on an inner peripheral surface of the support member 7 in surrounding relation to the tool attaching portion 2a, the magnetic bearing 9 and the sensor unit 10 forming the vibration suppressing device 8.

The radial magnetic bearing 9 comprises a pair of electromagnets (radial electromagnets) 12a and 12b opposed to each other in the X-axis direction with a target 11 (mounted on an outer periphery of the tool attaching portion 2a) interposed therebetween, and another pair of electromagnets (radial electromagnets) 12c and 12d opposed to each other in the Y-axis direction with the target 11 interposed therebetween. These electromagnets will hereinafter be referred to, using reference numeral 12.

The radial displacement sensor unit 10 comprises a pair of radial displacement sensors 14a and 14b respectively disposed immediately beneath the pair of electromagnets 12a and 12b and opposed to each other in the X-axis direction with the tool attaching portion 2a interposed therebetween, and another pair of radial displacement sensors 14c and 14d respectively disposed immediately beneath the pair of electromagnets 12c and 12d and opposed to each other in the Y-axis direction with the tool attaching portion 2a interposed therebetween. These displacement sensors will hereinafter be referred to, using reference numeral 14.

The electromagnets 12 and the displacement sensors 14 are electrically connected to an electromagnet control unit 15 forming an electromagnet controller.

The electromagnet control unit 15 includes a DSP (digital signal processor) 16 serving as digital processing means capable of software programming. Functionally, the DSP includes a displacement detection portion 17, an exciting current control portion 18, a resonance frequency detection portion 19 serving as a resonance frequency detector, and a phase lead control portion 20 serving as a phase lead controller.

The displacement detection portion 17 detects a displacement of the tool attaching portion 2a in the X-axis direction on the basis of outputs of the pair of displacement sensors 14a and 14b, and also detects a displacement of the tool attaching portion 2a in the Y-axis direction on the basis of outputs of the other pair of displacement sensors 14c and 14d.

On the basis of displacements of the tool attaching portion 2a in the X-axis and Y-axis directions, the exciting current control portion 18 controls exciting currents to be supplied to the respective electromagnets 12 so that each displacement becomes a predetermined value (usually, 0). The exciting current is the sum of a predetermined steady-state current and a control current varying with the displacement. The exciting current control portion 18 calculates the control current for each electromagnet 12 on the basis of the displacement, for example, by PID control, and supplies the exciting current (which is the sum of this control current and the steady-state current) to the corresponding electromagnet 12.

Thus, the tool attaching portion 2a is supported in a predetermined position (where each displacement is usually 0) by the radial magnetic bearing 9, and the generation of resonance of the spindle 2 is suppressed.

The resonance frequency detection portion 19 detects the resonance frequency of the spindle 2, for example, by effecting the frequency analysis of the outputs of the displacement sensors 14 by the use of FFT.

The phase lead control portion 20 effects a phase lead control for the detected resonance frequency of the spindle 2. The phase lead control portion 20 is, for example, a digital phase lead filter formed by software.

By effecting such phase lead control, the generation of resonance of the spindle 2 can be more effectively suppressed.

The exciting current control portion 18 also checks whether or not a peak value of the displacement of the tool attaching portion 2a detected by the displacement detection portion 17 exceeds a predetermined threshold value, and if the peak value exceeds the threshold value, the exciting current control portion 18 increases a control gain to a level higher than an ordinary value, and increases a stiffness value of the magnetic bearing 9 to a level higher than an ordinary value. Then, if the peak value of the displacement exceeds the threshold value even when the stiffness value of the magnetic bearing 9 is increased to a certain degree, a warning is issued judging that the vibration is excessive, and preferably the machining operation is stopped.

The constituent portions of the spindle apparatus are not limited to the above embodiment, and can be suitably modified or changed.

In the above embodiment, although the support-purpose bearing unit is of the contact type comprising the pair of rolling bearing devices of the contact type, the support-purpose bearing unit may be of the contact type comprising other type of bearings, or may be of the non-contact type comprising, for example, a pair of axial magnetic bearings and two pairs of radial magnetic bearings, or may be of the non-contact type comprising other type of bearings, or may be of the type formed by a combination of the contact type and the non-contact type.

What is claimed is:

1. A spindle apparatus for a machine tool comprising:
    a housing;
    a spindle that is rotatably supported by the housing through a support-purpose bearing unit and is formed with a tool attaching portion at a distal end thereof;
    a driver that rotates the spindle;
    a tool attached to the tool attaching portion;
    a radial magnetic bearing that includes a plurality of electromagnets disposed around the tool attaching portion for suppressing vibration of the spindle;
    a plurality of radial displacement sensors provided around the tool attaching portion for detecting a displacement of the tool attaching portion in a radial direction;
    a support member fixed to the housing, the support member surrounding a portion of the spindle that is projected from the housing, and the support member fixing the radial magnetic bearing and the radial displacement sensors; and
    an electromagnet controller that controls the electromagnets of the radial magnetic bearing on the basis of outputs of the radial displacement sensors so as to support the tool attaching portion in a predetermined position.

2. The spindle apparatus according to claim 1, wherein the electromagnet controller includes a resonance frequency detector for detecting a resonance frequency of the tool attaching portion on the basis of the outputs of the radial displacement sensors; and a phase lead controller for effecting a phase lead control for the detected resonance frequency.

3. The spindle apparatus according to claim 1, wherein the support-purpose bearing unit includes a contact type bearing device.

4. The spindle apparatus according to claim 1, wherein a pair of the plurality of radial displacement sensors are opposed to each other in one radial direction with the tool attaching portion interposed therebetween, and another pair of the plurality of radial displacement sensors are opposed to each other in another radial direction perpendicular to the one radial direction.

5. The spindle apparatus according to claim 2, wherein the resonance frequency of the tool attaching portion is detected by effecting a frequency analysis of the outputs of the radial displacement sensors by use of fast Fourier transform.

6. The spindle apparatus according to claim 1, wherein the electromagnet controller includes a digital signal processor.

7. The spindle apparatus according to claim 6, wherein
the digital signal processor includes an exciting current control portion for detecting whether or not the displacement of the tool attaching portion exceeds a predetermined threshold value.

* * * * *